(12) United States Patent
Schmidt et al.

(10) Patent No.: US 9,421,922 B2
(45) Date of Patent: Aug. 23, 2016

(54) PILLAR COVERING FOR MOTOR VEHICLES (75) Inventors: Sebastian Schmidt, Stuttgart (DE);
Luc-Henry Blanche, Schwaikheim (DE); Ulrich Riegler, Lindhorst (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 14/344,578

(22) PCT Filed: Sep. 4, 2012

(86) PCT No.: PCT/EP2012/067198
§ 371 (c)(1),
(2), (4) Date: May 21, 2014

(87) PCT Pub. No.: WO2013/041368
PCT Pub. Date: Mar. 28, 2013

(65) Prior Publication Data
US 2014/0375073 A1 Dec. 25, 2014

(30) Foreign Application Priority Data
Sep. 23, 2011 (EP) ..................... 11182546

(51) Int. Cl.
*B60R 13/04* (2006.01)
*B62D 25/04* (2006.01)
*B29C 45/00* (2006.01)
*B60R 13/02* (2006.01)
(Continued)

(52) U.S. Cl.
CPC ............. *B60R 13/04* (2013.01); *B29C 45/0025* (2013.01); *B60R 13/025* (2013.01); *B62D 25/04* (2013.01); *B29C 45/1671* (2013.01); *B29C 2045/0043* (2013.01); *B29L 2031/3005* (2013.01)

(58) Field of Classification Search
CPC .... B60R 13/025; B60R 13/04; B60R 13/043; B60R 13/06; B60J 5/04; B60J 5/0402; B60J 5/0481; B62D 25/04
USPC .................. 296/1.07, 1.08, 93, 146.9, 181.2; 49/500.1, 501
See application file for complete search history.

(56) References Cited

U.S. PATENT DOCUMENTS 5,571,581 A     11/1996  Koizumi et al.
6,103,168 A *  8/2000  Kelly ........................... 264/259

(Continued)

FOREIGN PATENT DOCUMENTS

DE    3831274      3/1988
DE    4219344      12/1992
(Continued)

OTHER PUBLICATIONS

English translation of DE 10 2008 056 146; retreived Apr. 14, 2015 from Espacenet Patentranslate website.*
(Continued)

*Primary Examiner* — Jason S Daniels
(74) *Attorney, Agent, or Firm* — Steinfl & Bruno LLP (57) ABSTRACT

A pillar covering for motor vehicles is described. The pillar covering has a carrier part with an integrated window guide web and a mounting element, a narrowing at the point of contact between the window guide web and the carrier part (1), and a cover part connected to the carrier part via a contact surface, where a stiffening rib is fitted within the narrowing.

26 Claims, 5 Drawing Sheets

(51) Int. Cl.
B29C 45/16 (2006.01)
B29L 31/30 (2006.01)

(56) References Cited

U.S. PATENT DOCUMENTS

| | | | | |
|---|---|---|---|---|
| 2009/0267373 | A1* | 10/2009 | Gerndorf et al. | 296/1.08 |
| 2010/0115851 | A1* | 5/2010 | Nakao et al. | 49/502 |
| 2011/0148139 | A1* | 6/2011 | Gerndorf et al. | 296/146.7 |
| 2011/0148150 | A1* | 6/2011 | Gerndorf et al. | 296/193.06 |
| 2014/0284954 | A1 | 9/2014 | Schmidt et al. | |

FOREIGN PATENT DOCUMENTS

| | | | |
|---|---|---|---|
| DE | 19633959 | | 2/1997 |
| DE | 19722551 | | 12/1998 |
| DE | 20201528 | | 6/2003 |
| DE | 202004006873 | | 7/2004 |
| DE | 102007024149 | | 11/2008 |
| DE | 102008056146 | | 5/2010 |
| DE | 102008056146 | A1 * | 5/2010 |
| EP | 1695808 | | 8/2006 |
| EP | 2062784 | A2 | 5/2009 |
| EP | 2272718 | | 1/2011 |
| GB | 2209702 | | 5/1989 |
| JP | S64-072821 | A | 3/1987 |
| JP | H0858507 | A | 3/1996 |
| JP | 2001171455 | A | 6/2001 |
| JP | 2002114124 | A | 4/2002 |
| JP | 2003320904 | A | 11/2003 |
| JP | 2005067564 | A | 3/2005 |
| JP | 2009029252 | | 2/2009 |
| JP | 2009143521 | A | 7/2009 |
| JP | 2009248640 | A | 10/2009 |
| JP | 2010069931 | A | 4/2010 |
| JP | 201452734 | A | 10/2014 |
| KR | 2020110001926 | A | 1/2011 |
| WO | WO 9605984 | A1 * | 2/1996 |
| WO | 2006094484 | | 9/2006 |

OTHER PUBLICATIONS

PCT International Search Report mailed on Dec. 5, 2012 for PCT/EP2012/067196 filed on Sep. 4, 2012 in the name of Saint-Gobain Glass France.

PCT International Search Report mailed on Dec. 6, 2012 for PCT/EP2012/067199 filed on Sep. 4, 2012 in the name of Saint-Gobain Glass France.

PCT International Search Report mailed on Dec. 5, 2012 for PCT/EP2012/067198 filed on Sep. 4, 2012 in the name of Saint-Gobain Glass France.

PCT Written Opinion mailed on Dec. 5, 2012 for PCT/EP2012/067196 filed on Sep. 4, 2012 in the name of Saint-Gobain Glass France (German w/ English translation).

PCT Written Opinion mailed on Dec. 5, 2012 for PCT/EP2012/067198 filed on Sep. 4, 2012 in the name of Saint-Gobain Glass France (German w/ English translation).

Non-Office Action issued on Apr. 16, 2015 by USPTO for U.S. Appl. No. 14/241,628, filed Apr. 9, 2014 in the name of Sebastian Schmidt.

Non-Office Action issued on Sep. 23, 2014 by USPTO for U.S. Appl. No. 14/344,571, filed May 21, 2014 in the name of Sebastian Schmidt.

Notice of Allowance issued on Apr. 13, 2015 by USPTO for U.S. Appl. No. 14/344,571, filed May 21, 2014 in the name of Sebastian Schmidt.

"Quickparts Learning Center Basics of Injection Molding", as existed on Aug. 8, 2011, retrieved from the Internet Archive Wayback Machine at http://web.archive.org/web/20110808175617/http://www.quickparts.com/LearningCenter/BasicsofInjectionMoldingDesign.aspx#draft.

PCT Written Opinion mailed on Dec. 6, 2012 for PCT/EP2012/067199 filed on Sep. 4, 2012 in the name of Saint-Gobain Glass France, German Original with English Translation.

Non-Office Action issued on Jul. 31, 2015 by USPTO for U.S. Appl. No. 14/241,628, filed Apr. 9, 2014 in the name of Sebastian Schmidt.

Non-Final Office Action for U.S. Appl. No. 14/241,628, filed Apr. 9, 2014 on behalf of Sebastian Schmidt. Mail Date: Jan. 8, 2016. 15 pages.

Notice of Allowance for U.S. Appl. No. 14/241,628, filed Apr. 9, 2014 on behalf of Sebastian Schmidt. Mail Date: Apr. 13, 2016, 8 pages.

German Translation of Japanese PTO Office Action for Japanese Application No. 2014-531163. Mail Date: Mar. 9, 2015.

English Translation of KIPO Notice of Preliminary Rejection for Korean Patent Application No. 10-2014-7007255. 4 pages.

* cited by examiner

PILLAR COVERING FOR MOTOR VEHICLES

CROSS REFERENCE TO RELATED APPLICATIONS

The present application is the US national stage of International Patent Application PCT/EP2012/067198 filed on Sep. 4, 2012 which, in turn, claims priority to European Patent Application EP 11182546.9 filed on Sep. 23, 2011.

The invention relates to a pillar covering for motor vehicles and use thereof.

In the wake of increasingly stringent regulations on the carbon dioxide emission of motor vehicles, there are strong efforts to reduce the weight of a vehicle and, thus, its fuel consumption. Constant innovations in the area of plastics enable the replacement of large portions of the metal automobile body with correspondingly lighter elements made of polymer materials. In particular, parts or even the entire window area can be replaced by elements made of polymer materials. In many cases, these have, along with a significantly lower weight, comparable hardness, stability, and toughness as with a vehicle window made of steel. Additionally, due to the weight reduction, the center of gravity of the vehicle is moved lower, which has a positive effect on handling. Moreover, compared to metals, polymer materials can be produced, processed, and shaped at significantly lower temperatures. This reduces the energy demand and the costs during production of the materials.

Molded parts made of polymer materials can be produced in virtually any desired shape and geometry. Special high-performance plastics such as aramids, for example, Kevlar, have very high strength and stability.

Many material parts made of plastic must satisfy various requirements and functions. Important parameters here are stability, fracture behavior, scratch resistance, impact strength, or notch impact strength. Besides technical considerations such as weight and strength of the individual components, shape, geometry, and appearance play an increasingly important role. Especially in the automobile industry, along with mechanical properties, design and aesthetics are of great significance.

In order to combine various characteristics in polymer materials, they are composed of differently shaped and differently produced basic materials. Established methods for producing these materials include two-component or multi-component injection molding. In this way, it is possible to combine characteristics such as weathering resistance, surface gloss, and fracture resistance or torsional stability with each other. In addition, the proportions of very expensive materials can be reduced.

DE 196 33 959 A1 discloses a molded article comprising a support and an outer decorative film. The outer film has a decorative layer and a protective layer, with the protective layer consisting of a photopolymerizable resin composition.

WO 2006/094484 A1 discloses a method for producing a two-dimensional, plastic vehicle body part including two components. In a preferred embodiment, the first component is made of a transparent polycarbonate and the second component is made of an opaque polycarbonate.

DE 197 22 551 A1 discloses a method for producing plastic parts in the two-component injection molding process.

EP 1 695 808 A1 discloses a decorative part for a motor vehicle, for example, a trim strip. The decorative part comprises a carrier part made of a thermoplastic plastic and a cover part. The decorative part is preferably produced by a multicomponent injection molding process.

In order to further reduce the weight of the pillar covering, the protruding components, such as the window guide web can be made thinner. In order to simultaneously increase stability and minimize the danger of breakage of the protruding thinned components, reinforcing ribs are injected from the outside in the thinned region. These reinforcing ribs can, however, only slightly increase the breakage resistance of the protruding, thinned component. In addition, externally injected reinforcing ribs can make the installation of the pillar covering more difficult due to the increased space requirement.

The object of the invention is to provide a workpiece that has increased strength and breakage resistance in the region of a protruding and thinned component.

The object of the invention is accomplished by a pillar covering for vehicles according to claim 1. Preferred embodiments emerge from the subclaims.

The use according to the invention of the pillar covering for vehicles emerges from another independent claim. Preferred embodiments emerge from the subclaims.

The pillar covering for vehicles according to the invention comprises at least one polymer carrier part with an integrated protruding component (window guide web) as well as a narrowing between the polymer carrier part and the window guide web. The preferably molded window guide web protrudes from the actual carrier part, and the precise dimensioning depends on the geometry of the corresponding workpiece on the vehicle. The window guide web is preferably implemented approx. L-shaped and preferably has, in the protruding region, an angle of 45° to 135° relative to the base surface of the polymer carrier part. The window guide web preferably has, in both sub-webs, a respective length of 10 mm to 20 mm. In the context of the invention, the expression "tapered" means a linear or gradual decrease in the thickness of the window guide web near or adjacent the base surface of the polymer carrier part. This decrease in thickness of the integrated protruding component reduces visual sink marks on the visible side of the component and enables a reduction in the weight of the pillar covering and a savings of polymer starting material.

The window guide web is preferably manufactured from the same material as the polymer carrier part and is preferably produced in the injection molding process using molds with corresponding cavities. Inside the narrowing, at least one stiffening rib is fitted. In the context of the invention, the expression "inside" also includes a configuration of the stiffening rib beyond the narrowing. Preferably, with no additional space requirement outside the integrated protruding component, the stiffening rib increases the stability, fracture resistance, and impact strength of the pillar covering.

The polymer carrier part preferably includes a mounting element opposite the window guide web. The mounting element is preferably configured F-shaped. The precise shaping of the mounting element is determined by the corresponding opposing part of the vehicle body. The mounting element preferably serves for vehicle body anchoring.

The polymer carrier part provides for the stability of the pillar covering and contains polymer materials, preferably thermoplastic polymers, with the highest possible strength, impact strength, or notch impact strength and relatively low susceptibility to breakage. A polymer cover part is connected to the polymer carrier part via a contact surface. The expression "contact surface" describes the boundary surface between the polymer carrier part and the polymer cover part. The polymer cover part can assume both decorative functions and functions in the area of tool resistance. Examples of this are surfaces or coatings that increase the weathering, UV, or chemical resistance of the pillar covering. The polymer carrier part and the polymer cover part form a common rounded end portion. In the context of the invention, the expression "end portion" preferably refers to a region in which the total thickness of the polymer carrier part and polymer cover part decreases gradually or linearly.

Depending on the geometry of the pillar covering, even further common, preferably rounded, end portions may be present. This edge geometry can be implemented circumferentially on all common edges of the polymer carrier part and polymer cover part inside the pillar covering or only on individual component edges. The entire pillar covering is preferably produced in one process step in a two-component or multicomponent injection molding process or multicomponent injection-compression molding process. In an alternative method, the polymer carrier part can be produced in one injection molding process with the narrowing and the window guide web. The polymer carrier part can subsequently be connected to a polymer cover part, likewise produced in an injection molding process.

The narrowing tapers preferably from 4 mm to 1 mm down to 2 mm to 0.2 mm. These dimensions enable high stability within the projection with simultaneously minimal weight and high optical quality. The projection preferably tapers over a length of 3 mm to 20 mm, preferably 5 mm to 10 mm on the above mentioned region. The narrowing enables a savings in material and weight of the finished component and improves the reflection optics on the visible side of the component.

Particularly preferably, a plurality of stiffening ribs is fitted inside the narrowing. Preferably, 5 to 30 stiffening ribs are fitted inside the narrowing. The placement of a plurality of stiffening ribs enables the targeted reinforcement of possible fracture susceptible regions within the narrowing.

The stiffening ribs are preferably configured beyond the narrowing. The stiffening ribs can support the integrated protruding component beyond the narrowing.

The integrated protruding component preferably comprises a window guide web of a motor vehicle.

The polymer carrier part contains preferably polyethylene (PE), polycarbonates (PC), polypropylene (PP), polystyrene, polybutadiene, polynitriles, polyesters, polyurethanes, polymethyl methacrylates, polyacrylates, polyesters, polyamides, polyethylene terephthalate (PET), preferably acrylonitrile-butadiene-styrene (ABS), acrylester-styrene-acrylonitrile (ASA), acrylonitrile-butadiene-styrene-polycarbonate (ABS+PC), and/or copolymers or mixtures thereof.

The window guide web and/or the mounting element preferably have, on the surface, a wall thickness thinning to 0.5 mm to 3 mm, with the thinned bottom wall of the window guide web and/or the mounting element preferably reinforced by a honeycomb, circular, or polygonal raised surface structure, particularly preferably a hexagonal raised honeycomb-like surface structure. The raised surface structure ensures, even with thinning of the wall thickness, the stability and the breakage safety of the window guide web and/or of the mounting element. The wall thickness thinning reduces the weight of the pillar covering. The raised structure preferably has a thickness of 0.2 mm to 1.5 mm. The total thickness of the window guide web and the raised surface structure is preferably greater by a factor of 1.2 to 3 than the thickness of the underlying window guide web. The factor mentioned ensures an optimum weight-to-stability ratio of the window guide web.

The raised surface structure preferably has a tilt of 1° to 15° relative to the perpendicular on the surface of the window guide web and/or the mounting element below the surface structure. This draft angle improves the removal of the fracture-sensitive window guide web and/or the mounting element from the injection mold.

The window guide web and/or the mounting element have, in an optional embodiment, the raised surface structure on regions of the window guide web and/or the mounting element without wall thickness thinning.

The polymer cover part preferably contains polycarbonates (PC), polymethyl methacrylate (PMMA), styrene-acrylonitrile (SAN), and/or copolymers or mixtures thereof. These polymers permit processing to high-gloss surfaces, glasslike in some cases, depending on the intended use.

The polymer carrier part preferably contains inorganic or organic fillers, particularly preferably $SiO_2$, $Al_2O_3$, $TiO_2$, clay minerals, silicates, zeolites, glass fibers, carbon fibers, glass beads, organic fibers, and/or mixtures thereof. The fillers can further increase the stability of the carrier part. In addition, the fillers can reduce the proportion of polymer materials and thus lessen the production costs of the component.

The mounting element preferably has a sealing lip opposite the end portion. The sealing lip enables a flexible and leak-proof installation of the pillar covering in the vehicle.

The polymer cover part preferably includes a hard coat, particularly preferably thermal- or UV-curing coatings, particularly preferably polysiloxanes, polyacrylates, polymethacrylates, and/or mixtures or copolymers thereof. The hard coat improves the resistance to mechanical scratch damage, weathering effects, temperature fluctuations, UV radiation, and/or aggressive chemicals from the air or from spray water. In addition, the hard coat can even also assume decorative functions.

The polymer cover part preferably has a mean optical transparency of more than 60%, preferably more than 80% in the range from 400 nm to 800 nm. The high optical transparency gives the polymer cover part a glasslike appearance with only a low weight of its own and high ductility.

The stiffening ribs preferably are from 1 cm to 15 cm apart, preferably 2 cm to 10 cm. The stiffening ribs thus placed significantly increase the stability and breakage safety of the window guide web. The precise distance between the stiffening ribs further depends on the material used for the polymer cover part and the required stability of the pillar covering.

The integrated, protruding component preferably has, on the side opposite the narrowing, reinforcing ribs that further increase the stability of the window guide web.

The pillar covering according to the invention particularly preferably contains stiffening ribs inside the tapered projection as well as reinforcing ribs in the region adjacent and outside the tapered projection.

The invention further includes the use of the pillar covering in vehicles, preferably motor vehicles, trucks, buses, particularly preferably as a trim strip in motor vehicles.

The invention is explained in detail in the following with reference to figures. The figures are purely schematic presentations and not to scale. They in no way restrict the invention. They depict.

Figure 1:
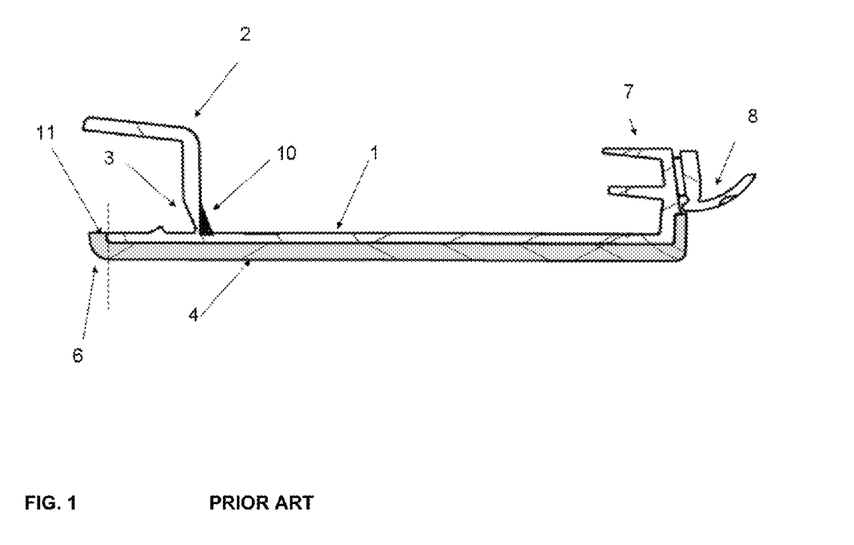
FIG. 1 a cross-section of a pillar covering according to the prior art.

FIG. 1 depicts a cross-section of a pillar covering according to the prior art. A polymer carrier part (1) comprises a molded, integrated protruding component (2), in this case, a window guide web (2). The polymer carrier part (1) further comprises an F shaped mounting element (7) with a sealing lip (8) and is surrounded by a polymer cover part (4). The window guide web (2) is connected via a narrowing (3) to the polymer carrier part (1). A reinforcing rib (10) is fitted outside the narrowing (3). The reinforcing rib (10) increases the breakage resistance of the window guide web (2), but requires additional space on the polymer carrier part (1). Along the contact surface (11), the polymer carrier part (1) and polymer cover part (4) transition into an end portion (6).

Figure 2:
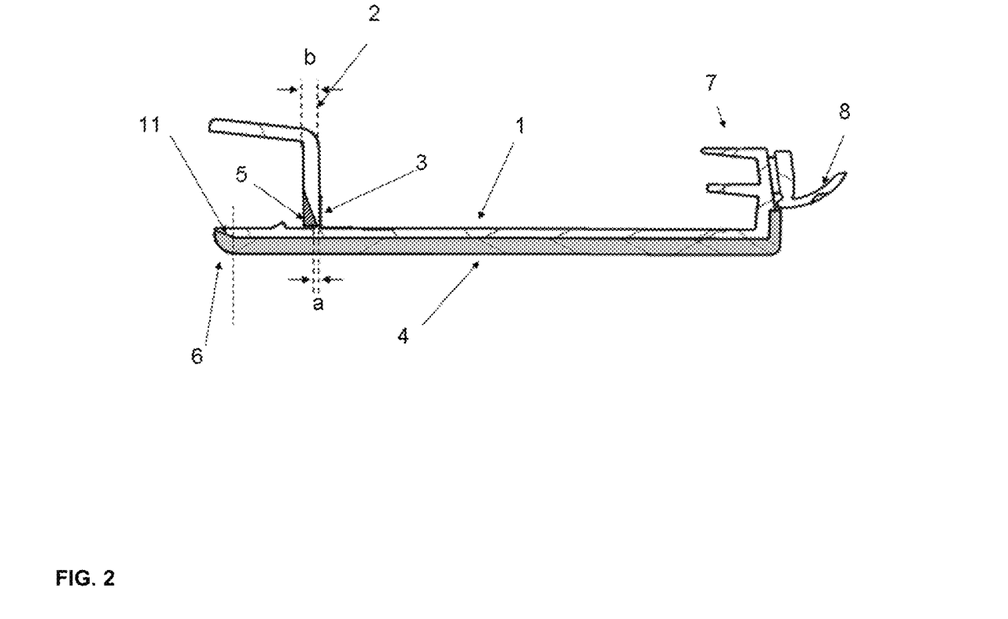
FIG. 2 a cross-section of a pillar covering according to the invention.

FIG. 2 depicts a schematic cross-section of a pillar covering according to the invention. The basic structure composed of a polymer carrier part (1) with a window guide web (2), F-shaped mounting element (7) with a sealing lip (8), and a polymer cover part (4) corresponds to that depicted in FIG. 1. In contrast thereto, a stiffening rib (5) is disposed inside the tapered projections (3) and permits effective stabilization of the window guide web (2) with no additional space requirement. The window guide web (2) decreases inside the narrowing (3) from the diameter (b) to the smaller diameter (a) in the range from 4 mm to 1 mm down to 2 mm to 0.2 mm.

Figure 3:
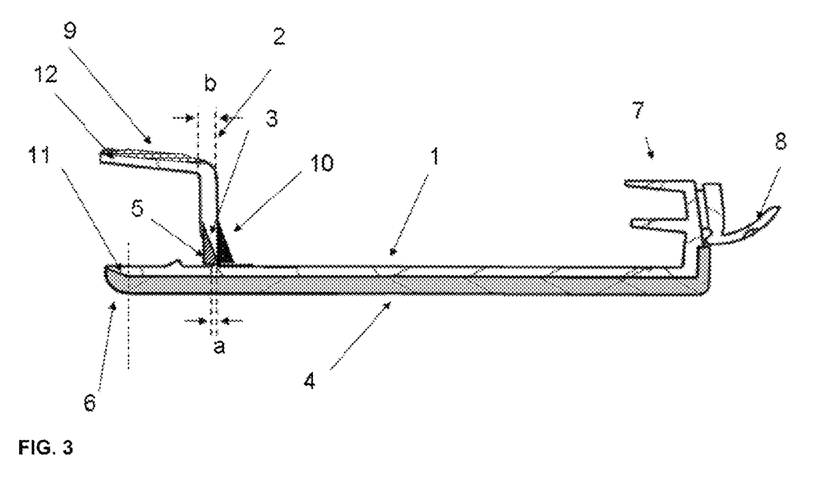
FIG. 3 a cross-section of a preferred embodiment of the pillar covering according to the invention, FIG. 4 a three-dimensional view of a preferred embodiment of the pillar covering, and FIG. 5 a schematic cross-section of three preferred embodiments of the stiffening ribs according to the invention.

FIG. 3 depicts a schematic cross-section of a preferred embodiment of the pillar covering according to the invention. The basic structure composed of a polymer carrier part (1) with a window guide web (2), F-shaped mounting element (7) with a sealing lip (8), polymer cover part (4), and stiffening rib (5) corresponds to that depicted in FIG. 2. The window guide web (2) also has reinforcing ribs (10), fitted outside the narrowing (3), and a wall thickness thinning (12) to a thickness of 0.5 mm to 3 mm. A raised surface structure (9) in the region of the wall thickness thinning (12) and the reinforcing ribs (10) increase the stability and breakage resistance of the window guide web (2).

Figure 4:
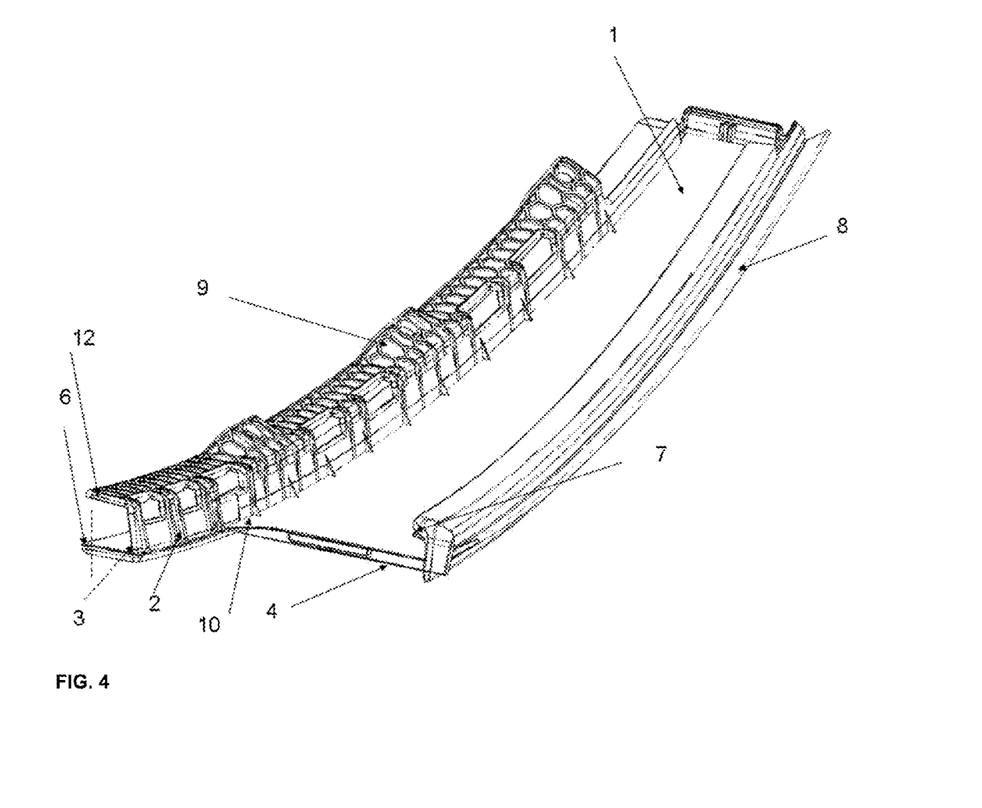

FIG. 4 depicts a three-dimensional view of a preferred embodiment of the pillar covering. The structure corresponds to that depicted in FIG. 3. The raised honeycomb-like surface structure (9) is disposed on the surface of the window guide web (2) in the form of regular hexagons covering the surface. The raised surface structure (9) ensures sufficient stability of the window guide web (2) along with simultaneous wall thickness thinning (12) to a thickness from 0.5 mm to 3 mm. In addition, the surface structure (9) facilitates the removal of the pillar covering from the injection mold during the production process. The reinforcing ribs (10) can be disposed both with regular and irregular spacing on the outside of the window guide web (2).

Figure 5:
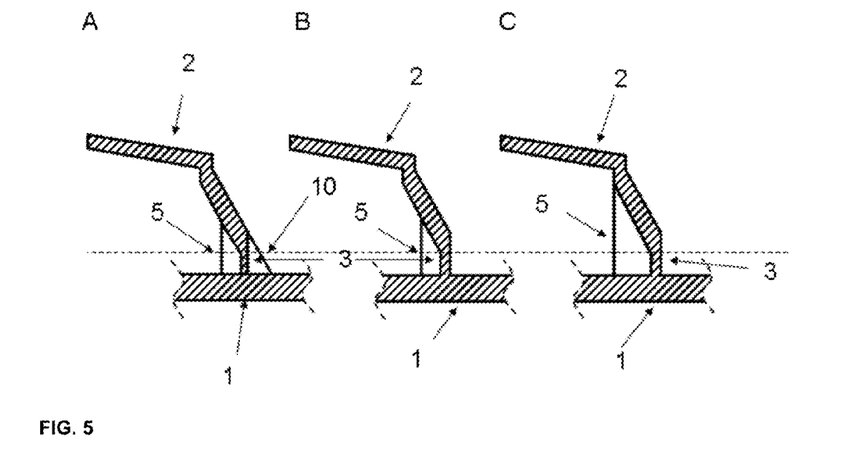

FIG. 5 depicts a schematic cross-section of three preferred embodiments of the stiffening ribs (A, B, C) according to the invention.

In the first variant (A), the stiffening rib (5) goes beyond the narrowing (3) below the dashed line. The stiffening rib (5) thus supports the integrated component (2) protruding from the polymer carrier part (1) beyond the narrow (3). In order to absorb loads that are directed away from the stiffening rib (5), another reinforcing rib (10) is disposed on the side opposite the stiffening rib (5).

The second variant (B) corresponds to the first variant (A) with no additional reinforcing rib (10).

The third variant (C) corresponds in its basic structure to the second variant (B). However, the stiffening rib (5) protrudes far beyond the narrowing (3) and supports as well as reinforces a large part of the integrated, protruding component (2).

LIST OF REFERENCE CHARACTERS (1) polymer carrier part
(2) integrated protruding component/window guide web
(3) narrowing
(4) polymer cover part
(5) stiffening rib
(6) end portion
(7) mounting element
(8) sealing lip
(9) raised surface structure
(10) reinforcing rib
(11) contact surface
(12) wall thickness thinning
(a) minimum dimension of the tapered projection
(b) maximum dimension of the tapered projection
(A),(B), (C) variations of the window guide web

The invention claimed is:

1. A pillar covering for vehicles, comprising:
a carrier part with an integrated window guide web and a mounting element;
a tapered narrowing at a point of contact of the window guide web with the carrier part, with the narrowing having a gradually or linearly decreasing thickness of the window guide web adjacent a base surface of the carrier part;
a cover part connected to the carrier part via a contact surface, and
a stiffening rib fitted inside the tapered narrowing;
wherein the window guide web has a wall thickness thinning to a thickness of 0.5 mm to 3 mm, wherein the window guide web has a raised surface structure which is a honeycomb circular or polygonal raised surface structure, wherein the raised surface structure is disposed on the wall thickness thinning, and wherein a total thickness of the window guide web and the raised surface structure is greater by a factor of 1.2 to 3 than the thickness of the underlying window guide web.

2. The pillar covering according to claim 1, wherein the tapered narrowing tapers from a width of 4 mm to 1 mm down to 2 mm to 0.2 mm.

3. The pillar covering according to claim 1, wherein the stiffening ribs extend beyond the tapered narrowing.

4. The pillar covering according to claim 1, wherein the window guide web is approximately L-shaped.

5. The pillar covering according to claim 1, wherein the carrier part contains polyethylene (PE), polycarbonates (PC), polypropylene (PP), polystyrene, polybutadiene, polynitriles, polyesters, polyurethanes, polymethyl methacrylates, polyacrylates, polyamides, polyethylene terephthalate (PET), polybutylene terephthalate (PBT), preferably acrylonitrile-butadiene-styrene (ABS), acrylester-styrene-acrylonitrile (ASA), acrylonitrile-butadiene-styrene-polycarbonate (ABS/PC), PET+PC, PBT+PC, and/or copolymers or mixtures thereof.

6. The pillar covering according to claim 1, wherein the mounting element has a wall thickness thinning to a thickness of 0.5 mm to 3 mm.

7. The pillar covering according to claim 6, wherein the mounting element has a raised surface structure.

8. The pillar covering according to claim 7, wherein the raised surface structure of the mounting element is disposed on the wall thickness thinning.

9. The pillar covering according to claim 1, wherein the cover part contains polycarbonates (PC), polymethyl methacrylate (PMMA), styrene-acrylonitrile (SAN), and/or copolymers or mixtures thereof.

10. The pillar covering according to claim 1, wherein the carrier part contains fillers.

11. The pillar covering according to claim 10, wherein the fillers comprise one or more of SiO2, Al2O3, TiO2, clay minerals, silicates, zeolites, glass fibers, carbon fibers, glass beads, and organic fibers.

12. The pillar covering according to claim 1, wherein the mounting element has a sealing lip.

13. The pillar covering according to claim 1, wherein the cover part includes a hard coat.

14. The pillar covering according to claim 13, wherein the hard coat is a thermal or UV-curing coating.

15. The pillar covering according to claim 14, wherein the curing coating comprises polysiloxanes, polyacrylates, polymethacrylates, and/or mixtures or copolymers thereof.

16. The pillar covering according to claim 1, wherein the stiffening ribs are from 1 cm to 15 cm apart.

17. The pillar covering according to claim 1, wherein the window guide web has reinforcing ribs.

18. A method comprising:
   using the pillar covering according to claim 1 as a trim strip in motor vehicles.

19. The pillar covering according to claim 1, wherein the surface structure is a hexagonal raised surface structure.

20. The pillar covering according to claim 1, wherein the stiffening ribs are from 2 cm to 10 cm apart.

21. A vehicle comprising the pillar covering of claim 1.

22. The vehicle according to claim 21, wherein the pillar covering is a trim strip.

23. The vehicle according to claim 21, wherein the vehicle is a motor vehicle.

24. The vehicle according to claim 21, wherein the vehicle is a bus or a truck.

25. The pillar covering according to claim 1, wherein the mounting element is configured F-shaped.

26. The pillar covering according to claim 1, wherein the mounting element has a raised surface structure.

* * * * *